United States Patent
Zhu et al.

(10) Patent No.: US 10,414,061 B2
(45) Date of Patent: Sep. 17, 2019

(54) FOOD CUTTER

(71) Applicant: Shiny Electrical Appliances Co., Ltd., Guangdong (CN)

(72) Inventors: Xiangmin Zhu, Guangdong (CN); Weihua Xiao, Guangdong (CN); Wuhui Peng, Guangdong (CN)

(73) Assignee: Shiny Electrical Appliances Co., Ltd., Guangdong (CN)

( * ) Notice: Subject to any disclaimer, the term of this patent is extended or adjusted under 35 U.S.C. 154(b) by 406 days.

(21) Appl. No.: 15/337,911

(22) Filed: Oct. 28, 2016

(65) Prior Publication Data
US 2017/0312929 A1 Nov. 2, 2017

(30) Foreign Application Priority Data
Apr. 29, 2016 (CN) .......................... 2016 1 0284785

(51) Int. Cl.
| | |
|---|---|
| *A47J 43/044* | (2006.01) |
| *A47J 19/02* | (2006.01) |
| *A47J 21/00* | (2006.01) |
| *B26D 3/26* | (2006.01) |
| *A23N 3/00* | (2006.01) |
| *A23N 7/10* | (2006.01) |
| *B26D 3/28* | (2006.01) |
| *B26D 1/28* | (2006.01) |
| *B26D 3/11* | (2006.01) |

(52) U.S. Cl.
CPC ................. *B26D 3/26* (2013.01); *A23N 3/00* (2013.01); *A23N 7/10* (2013.01); *B26D 1/28* (2013.01); *B26D 3/11* (2013.01); *B26D 3/283* (2013.01); *B26D 2003/286* (2013.01); *B26D 2003/287* (2013.01); *B26D 2210/02* (2013.01)

(58) Field of Classification Search
CPC .......... A47J 43/00–042; A47J 19/02–06; A47J 21/00; A47J 23/00; A47J 25/00; A47J 2043/04409–04445; A47J 2043/04454–0449; B26D 3/26
See application file for complete search history.

(56) References Cited

U.S. PATENT DOCUMENTS

| | | | | |
|---|---|---|---|---|
| 2,352,235 A | * | 6/1944 | Tautz ..................... | B27G 19/02 83/102.1 |
| 6,585,179 B2 | * | 7/2003 | Weibel .................... | B26D 3/26 241/169 |

(Continued)

FOREIGN PATENT DOCUMENTS

| | | |
|---|---|---|
| CN | 103587708 A | 2/2014 |
| CN | 203622518 U | 6/2014 |

(Continued)

*Primary Examiner* — Michael A Laflame, Jr.
(74) *Attorney, Agent, or Firm* — Mark Malek; Paul Ditmyer; Widerman Malek, PL

(57) ABSTRACT

The invention relates to a food cutter. The food cutter includes a vessel cup; a fixing base assembled in the vessel cup; a supporting body assembled to the vessel cup; a locking mechanism assembled in the supporting body; a screw cutter extending through the supporting body and the locking mechanism; and a handheld host connected to the screw cutter. The locking mechanism includes a resilient member, a movable bracket, a shaft sleeve, two sliding half threaded sheaths and a rotating cover.

20 Claims, 11 Drawing Sheets

(56) References Cited

U.S. PATENT DOCUMENTS

| | | | | |
|---|---|---|---|---|
| 7,100,854 B2* | 9/2006 | Aby-Eva | ................ | B26D 3/26 |
| | | | | 241/169 |
| 8,596,192 B2 | 12/2013 | Hauser et al. | | |
| 8,967,514 B2* | 3/2015 | Verheem | ................ | B26D 3/26 |
| | | | | 241/169 |
| 2001/0028007 A1* | 10/2001 | Michel | ................ | B26D 3/26 |
| | | | | 241/169 |
| 2004/0232101 A1* | 11/2004 | Gardner | ............ | B65D 1/0246 |
| | | | | 215/277 |
| 2005/0160894 A1* | 7/2005 | Canegallo | ............ | A47J 42/14 |
| | | | | 83/501 |
| 2006/0042480 A1* | 3/2006 | Blais | ................ | A47J 43/286 |
| | | | | 100/230 |
| 2008/0257168 A1* | 10/2008 | Wolfe | ................ | A47J 36/165 |
| | | | | 99/348 |
| 2011/0108649 A1* | 5/2011 | Horstmann | ............ | A47J 43/255 |
| | | | | 241/169 |
| 2015/0224658 A1* | 8/2015 | Whitney | ............ | B26D 1/0006 |
| | | | | 83/687 |
| 2016/0236202 A1* | 8/2016 | Leonardi | ............ | B02C 18/302 |
| 2017/0106376 A1* | 4/2017 | Quadrana | ............ | A22C 17/0026 |

FOREIGN PATENT DOCUMENTS

| | | |
|---|---|---|
| CN | 105773697 A | 7/2016 |
| CN | 205614749 U | 10/2016 |
| FR | 2742326 A1 | 6/1997 |

* cited by examiner

FOOD CUTTER

RELATED APPLICATIONS

This application claims the benefit of Chinese Patent Application No. 201610284785.9, filed on Apr. 29, 2016, the entire contents of which are incorporated herein by reference.

FIELD OF THE INVENTION

The present disclosure relates to a technical field of food process, and more particularly relates to a food cutter.

BACKGROUND OF THE INVENTION

In daily life, people need to deal with food. For example, when producing vegetable platter or fruit platter, or producing vegetable salad or fruit salad, it requires to cut the vegetable and fruit. In our daily life, generally, a normal fruit knife is adopted to perform a cutting to a small quantity of fruit or vegetable. However, it requires a multiplicity cutting when adopting the fruit knife to perform a cutting, further, during the cutting process, the cutting action is determined by naked eye, the cutting level difference is relative greater, lacking an aesthetic, and the cutting quality is influenced. When a manual cutting by knife is adopted, the labor intensity is greater. In some specific industry, for example, service industry such as hotel, KTV (Karaok TV) and bar, the quantity demand of vegetable, fruit is greater, and it requires a relative high aesthetic. The manual cutting has a low working efficiency and needs a great effort, and it cannot satisfy a great quantity demand.

SUMMARY OF THE INVENTION

Accordingly, it is necessary to provide a food cutter which has a high cutting efficiency.

A food cutter includes a vessel cup; a fixing base assembled in the vessel cup; a supporting body assembled to the vessel cup; a locking mechanism assembled in the supporting body; a screw cutter extending through the supporting body and the locking mechanism; and a handheld host connected to the screw cutter; wherein the locking mechanism comprises a resilient member, a movable bracket, a shaft sleeve, two sliding half threaded sheaths, and a rotating cover, an end of the resilient member abuts the supporting body, the other end of the resilient member abuts the movable bracket, the sliding half threaded sheaths are connected the movable bracket and slidable relative to the shaft sleeve, the rotating cover abuts the movable bracket, wherein the rotating cover rotates to drive the sliding half threaded sheaths to contact the shaft sleeve and engage the screw cutter, or drive the sliding half threaded sheaths to slide out from the shaft sleeve and disengage from the screw cutter.

A food cutter includes: a vessel cup; a supporting body assembled to the vessel cup; a locking mechanism assembled in the supporting body; a screw cutter extending through the supporting body and the locking mechanism; and a handheld host connected to the screw cutter; wherein the locking mechanism includes a resilient member, a movable bracket, a shaft sleeve, two sliding half threaded sheaths, and a rotating cover, the resilient member is resisted between the supporting body and the movable bracket, the shaft sleeve defines a shaft sleeve hole extending though a centre thereof and two sliding through slots extending laterally, the screw cutter extends through the shaft sleeve hole, the two sliding half threaded sheaths are received in the two sliding through slots and engage the movable bracket, the two sliding half threaded sheaths art slidable relative to the shaft sleeve, the rotating cover abuts the movable bracket, wherein the rotating cover rotates to drive the two sliding half threaded sheaths to slide toward each other to engage the screw cutter, or drive the two sliding half threaded sheaths to slide away from each other to disengage from the screw cutter.

In above food cutter, the supporting body and the vessel cup form a stable working space therebetween, the food to be cut is positioned on the fixing base, the screw cutter is assembled to the locking mechanism. When in working, the rotating cover rotates clockwise/anticlockwise to drive the movable bracket downwardly and drive the two sliding half threaded sheaths to slide in the shaft sleeve, thereby the two sliding half threaded sheaths lock the screw cutter, and then the handheld host rotates the screw cutter quickly to perform a cutting process to vegetable and fruit. When the cutting is accomplished, the handheld host disengages from the screw cutter, the rotating cover rotates clockwise/anticlockwise to drive the two sliding half threaded sheaths to slide out of the shaft sleeve to release the screw cutter, thereby the screw cutter can be dismantled and washed quickly, and prepared for the next cut. Because the handheld host drives the screw cutter to rotate, a manual operation can be replaced, it is labor saving and a working efficient can be enhanced, and it is suitable for a massive operation. The locking mechanism positions the screw cutter, the fixing base positions the food to be cut, thus a stable securing of the food to be cut can be achieved, a cutting force is even, and a cutting quality is secured. Due to connection relationships between the parts of the locking mechanism, the screw cutter can be secured and released quickly, and can be washed and returned timely for a new cut, it is time saving and a high cutting efficiency can be achieved.

BRIEF DESCRIPTION OF THE DRAWINGS

These and other features of the present invention will become readily apparent upon further review of the following specification and drawings. In the drawings, like reference numerals designate corresponding parts throughout the views. Moreover, components in the drawings are not necessarily drawn to scale, the emphasis instead being placed upon clearly illustrating the principles of the present disclosure.

DETAILED DESCRIPTION OF THE EMBODIMENTS

Figure 1:
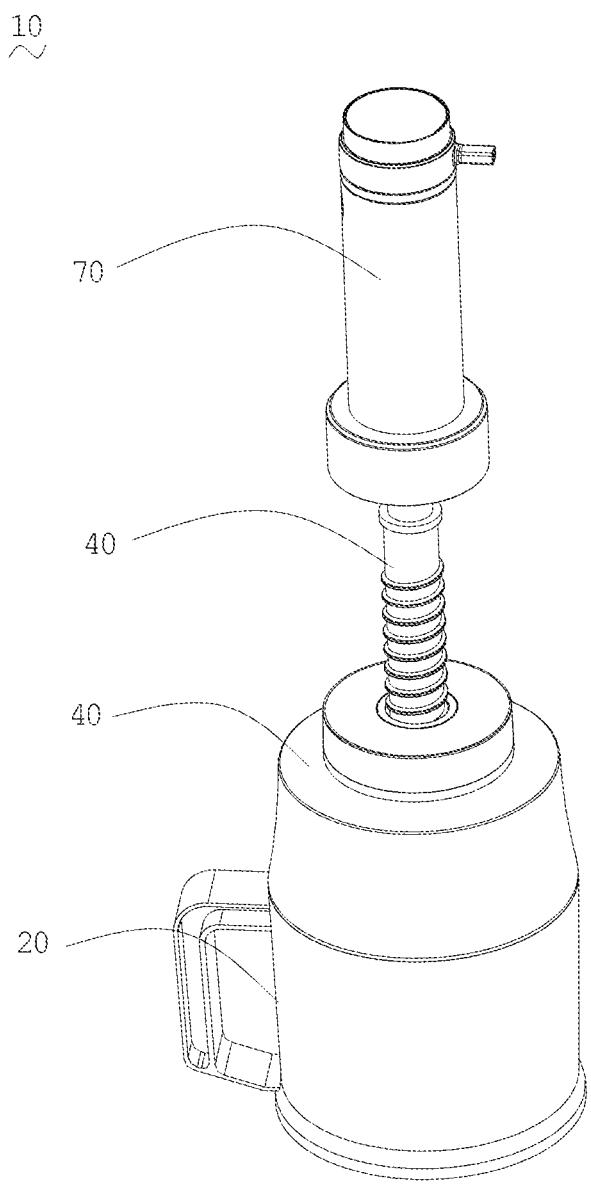
FIG. 1 is a perspective view of a food cutter according to an embodiment.

Embodiments of the invention are described more fully hereinafter with reference to the accompanying drawings. The various embodiments of the invention may, however, be embodied in many different forms and should not be construed as limited to the embodiments set forth herein. Rather, these embodiments are provided so that this disclosure will be thorough and complete, and will fully convey the scope of the invention to those skilled in the art. Elements that are identified using the same or similar reference characters refer to the same or similar elements.

Referring to FIG. 1 through FIG. 5, a food cutter 10 according to an embodiment is shown. The food cutter 10 is configured to cut the food, especially for vegetable and fruit, such as pineapple, apple or white gourd. The food cutter 10 includes a vessel cup 20, a fixing base 30 assembled in the vessel cup 20, a supporting body 40 assembled in the vessel cup 20, a locking mechanism 50 assembled to the supporting body 40, a screw cutter 60 extending through the supporting body 40 and the locking mechanism 50, and a handheld host 70 connected to the screw cutter 60. When the locking mechanism 50 is positioned on a locking state, the handheld host 70 drives the screw cutter 60 to rotate and move downwardly to cut the food positioned in the fixing base 30. When the locking mechanism 50 is positioned in a release state, the screw cutter 60 can be taken down, the food after cut can be taken from the fixing base 30 and the screw cutter can be washed for the next cut.

Figure 6:
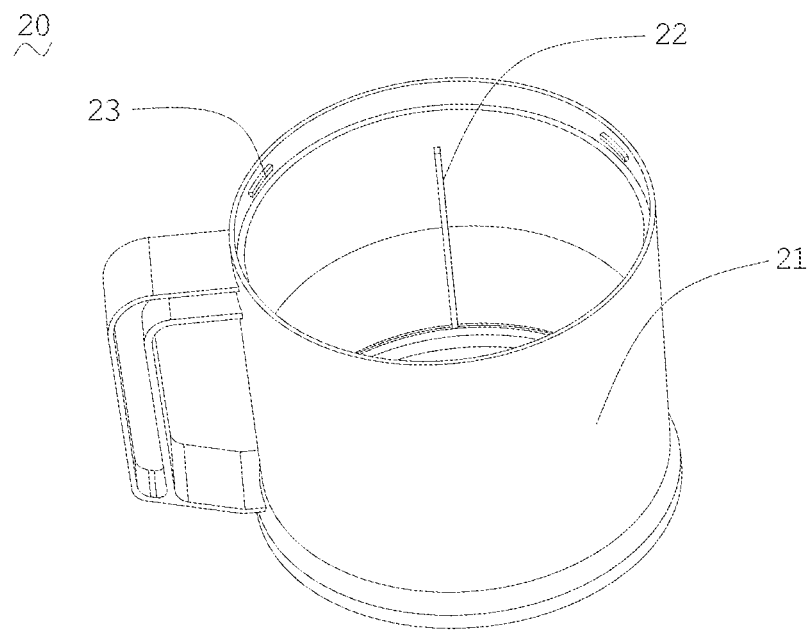
FIG. 6 is a perspective view of a vessel cup.

Referring to FIG. 6, the vessel cup 20 includes a cylindrical vessel cup body 21 and a cup knob, the vessel cup body 21 is provided with a plurality of erected protrusion ribs 22 at an inner wall thereof. A top inner wall of the vessel cup body 21 is provided with a plurality of latching strips 23 extending along a peripheral direction of the vessel cup body 21.

Figure 7:
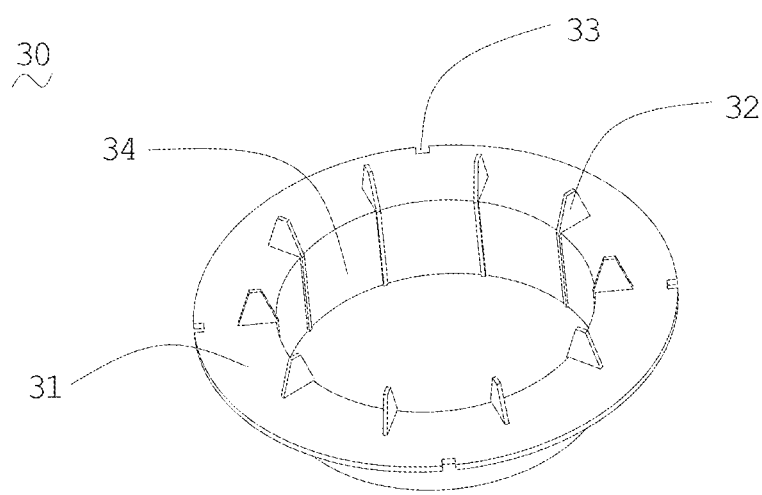
FIG. 7 is a perspective view of a fixing base.

Referring to FIG. 7, the fixing base 30 includes an annulus fixing base body 31 and a limiting ring 34 extending downwardly from an inner edge of the fixing base body 31. A plurality of positioning lugs 32 extends from a top surface of the fixing base body 31 and an inner wall of the limiting ring 34. The plurality of positioning lugs 32 are spaced from each other along a peripheral direction. An upper end of the positioning lug 32 is positioned along a preset inclined angle. The fixing base body 31 defines a plurality of latching cutouts 33. Both the number of the latching cutouts 33 and the number of the protrusion ribs 22 of the vessel cup 20 are four, the protrusion ribs 22 engage the latching cutouts 33.

Figure 8:
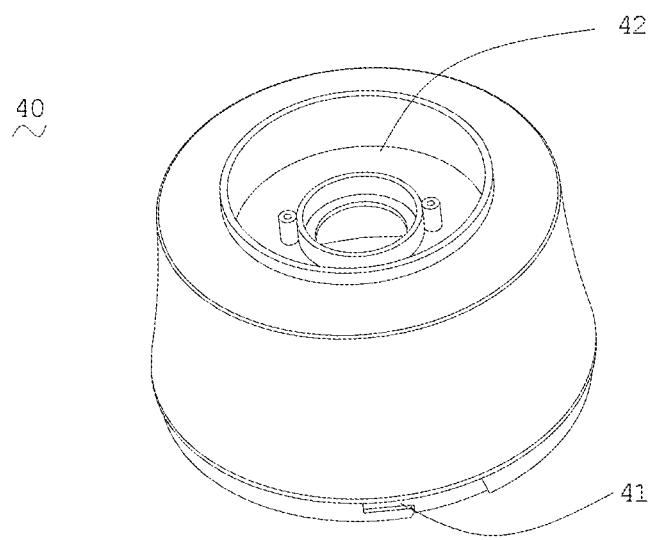
FIG. 8 is a perspective view of a supporting body.

Referring to FIG. 8, the supporting body 40 has a circular platform shape. The supporting body 40 defines a plurality of latching grooves 41 at a circular peripheral of a bottom thereof. The latching grooves 41 latch with the latching strips 23 to assembly the supporting body 40 to the vessel cup 20 quickly and stably. The supporting body 40 defines a containing groove 42 at a top centre thereof.

Figure 9:
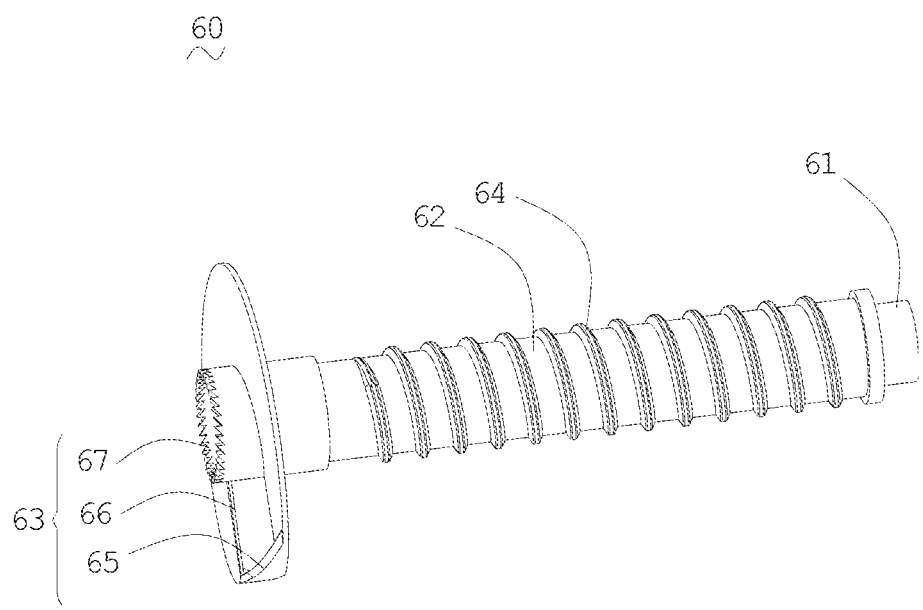
FIG. 9 is a perspective view of a screw cutter.

Referring to FIG. 9, the screw cutter 60 includes a connecting portion 61, a threaded pipe 62, and a disc cutter 63 arranged in a sequence downwardly. The connecting portion 61 and the disc cutter 63 are connected to opposite ends of the threaded pipe 62, respectively. The connecting portion 61 is connected to an output shaft of the handheld host 70. The threaded pipe 62 is provided with a thread 64 which is spirally arranged. The disc cutter 63 is positioned to face the fixing base 30, the disc cutter 63 includes a lateral cutter 65, a flat cutter 66, and a round cutter 67, such structure can provide a peeling and cored function, and can slice out fruit strip or vegetable strip.

Figure 2:
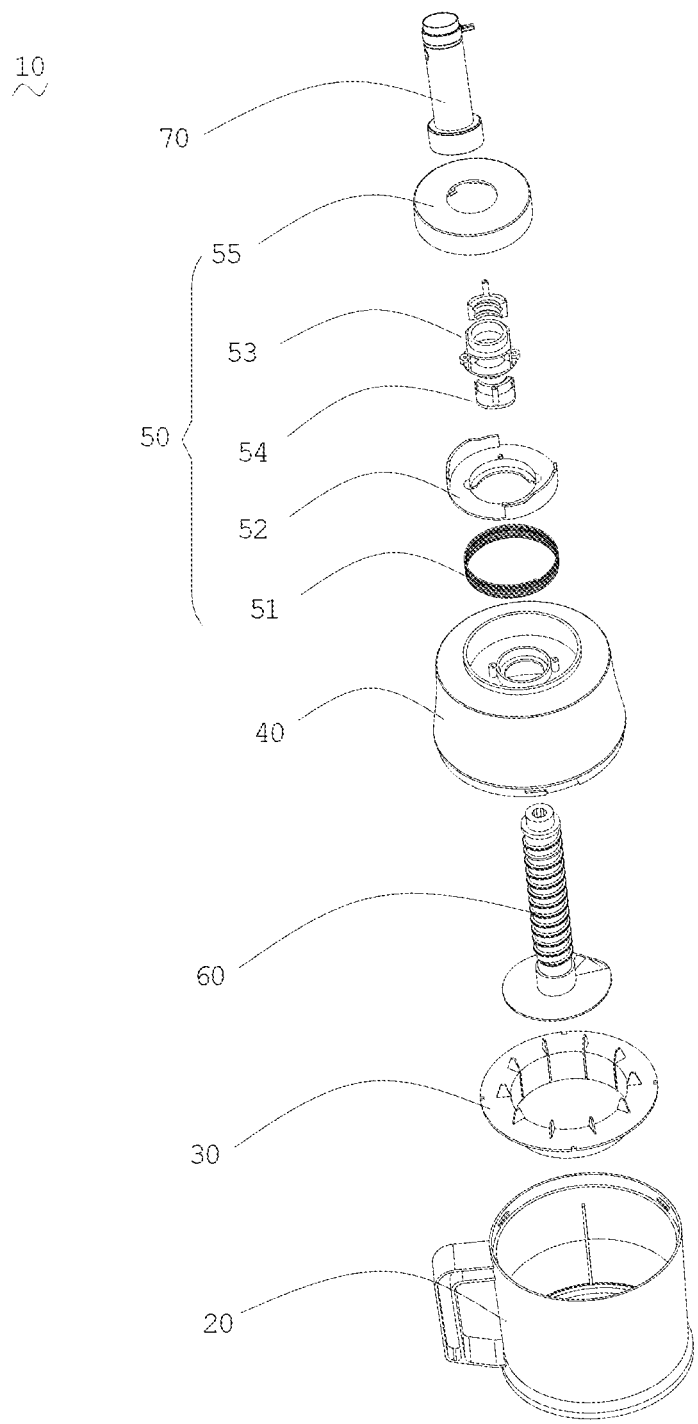
FIG. 2 is an exploded view of the food cutter in FIG. 1.
Figure 3:
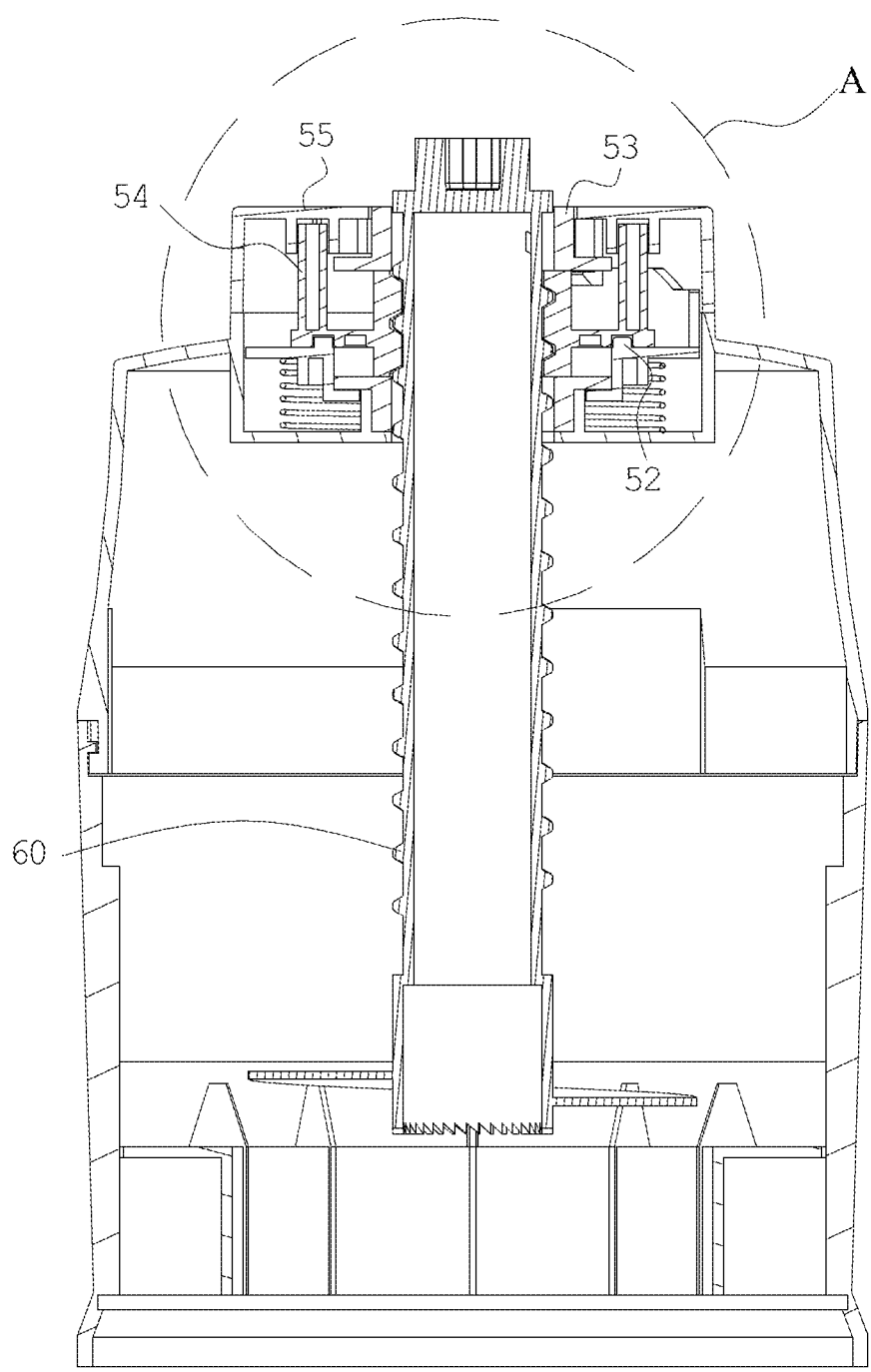
FIG. 3 is a cross-sectional view of a portion of a food cutter when the food cutter in a working state.
Figure 4:
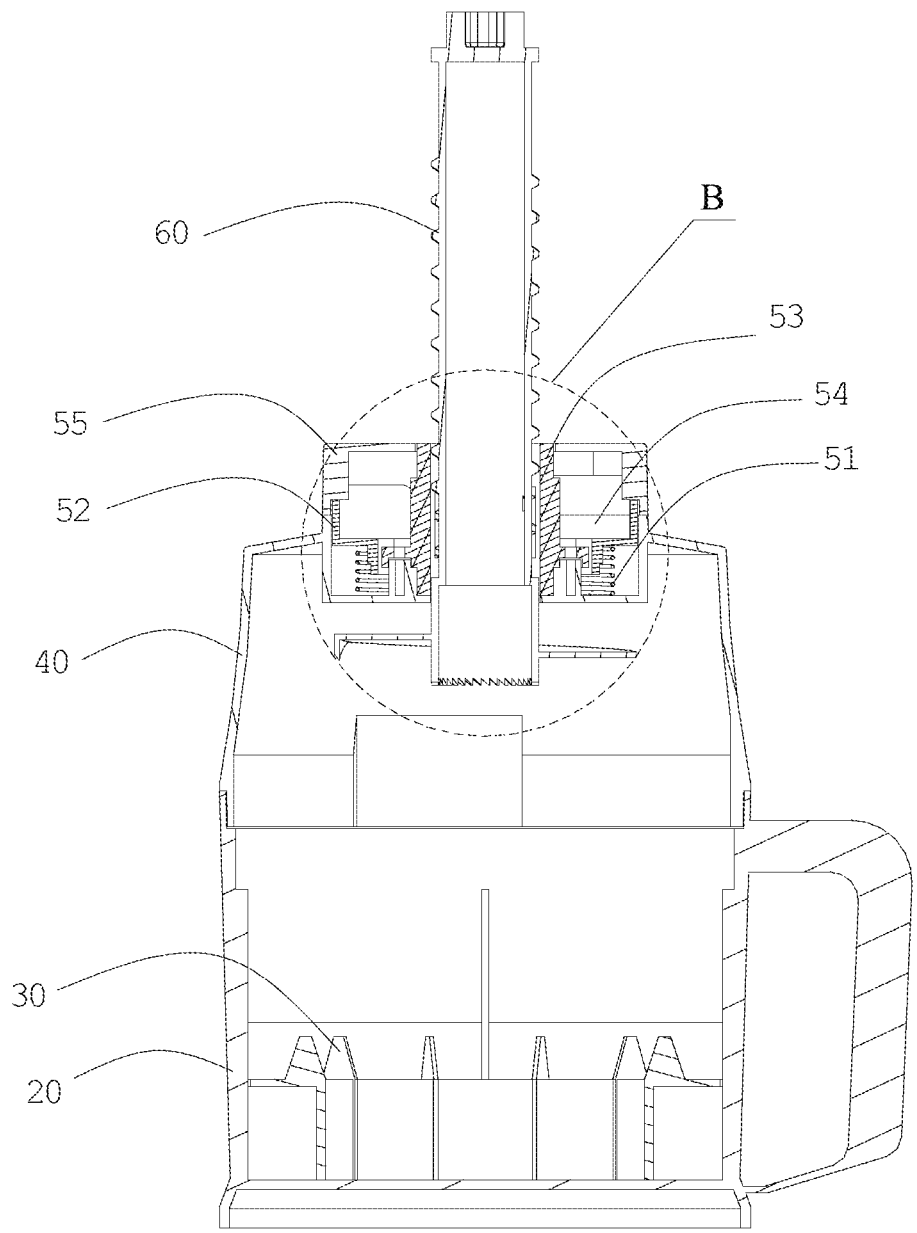
FIG. 4 is a cross-sectional view of a portion of a food cutter when the food cutter in another working state.
Figure 5:
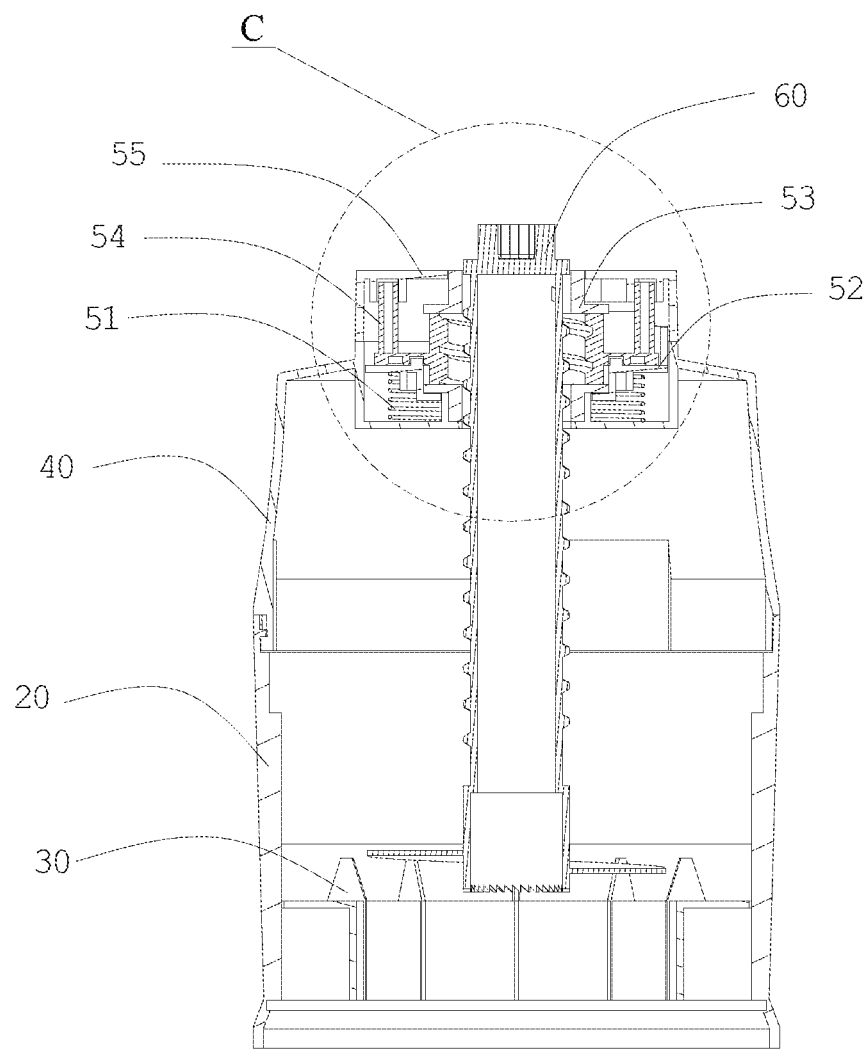
FIG. 5 is a cross-sectional view of a portion of a food cutter when the food cutter in a release state.

Referring to FIG. 2 through FIG. 5 again, the locking mechanism 50 includes a resilient member 51, a movable bracket 52, a shaft sleeve 53, a pair of sliding half threaded sheaths 54, and a rotating cover 55. The resilient member 51 and the shaft sleeve 53 are received in the containing groove 42, the movable bracket 52 abuts the resilient member 51, the rotating cover 55 abuts the movable bracket 52 and engages the supporting body 40. The shaft sleeve 53 is connected to the movable bracket 52. The sliding half threaded sheaths 54 slide along a radial direction of the shaft sleeve 53 to extend into the side portion of the shaft sleeve 53, and the sliding half threaded sheaths 54 engage the movable bracket 52. When the rotating cover 55 rotates, it drives the sliding half threaded sheaths 54 to slide into the shaft sleeve 53 and engage the screw cutter 60 or it drives the shaft sleeve 53 to slide out and separates from the screw cutter 60.

Preferably, the resilient member 51 is a spring, an end of the resilient member 51 abuts the supporting body 40, and an opposite end of the resilient member 51 abuts the movable bracket 52.

Figure 10:
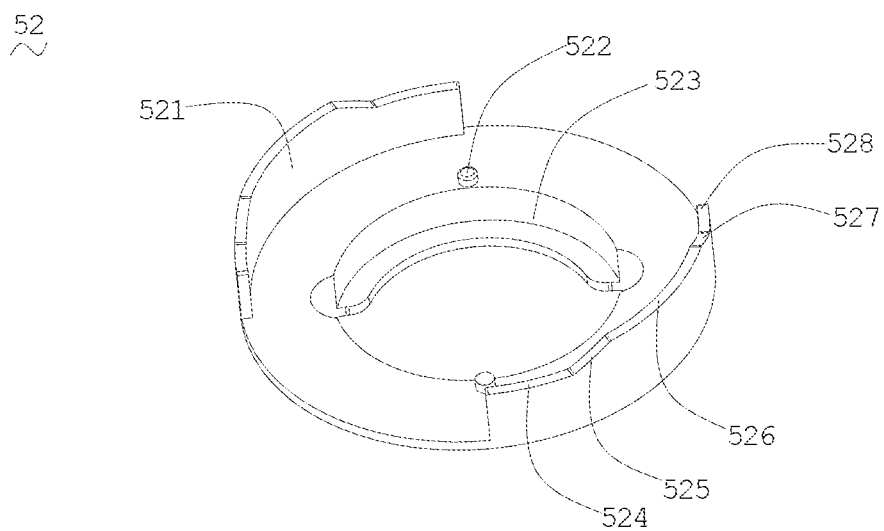
FIG. 10 is a perspective view of a movable bracket.

Referring to FIG. 10, the movable bracket 52 has an annulus shape, and includes a pair of guiding sheets 521 symmetrically extending from opposite edges of the movable bracket 52 upwardly, a pair of positioning posts 522 extending from a top surface, an undertaking groove 523 positioned in an inner ring. A middle of the guiding sheet 521 is higher than opposite edges of the guiding sheet 521. A top surface of the guiding sheet 521 includes a first end surface 524, a second end surface 525, a third end surface 526, a fourth end surface 527 and a fifth end surface 528 connected in a sequence. The third end surface 526 which is positioned in the middle portion is higher than the other end surfaces. The first end surface 524 and the fifth end surface 528 which are positioned in opposite ends of the guiding sheet 521 are lower than the other end surfaces. The second end surface 525 and the fourth end surface 527 extend obliquely.

Figure 11:
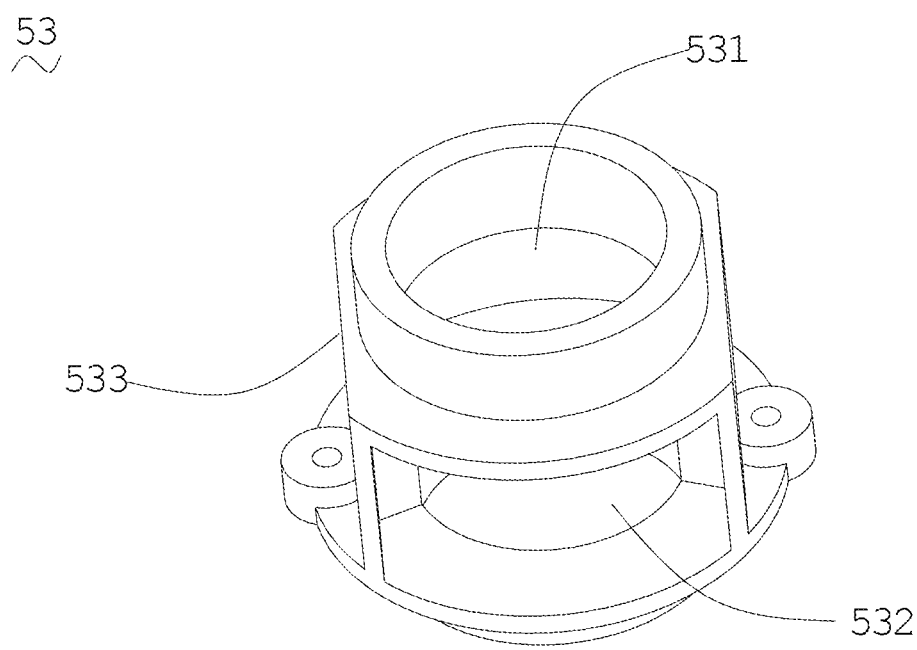
FIG. 11 is a perspective view of a shaft sleeve.

Referring to FIG. 11, the shaft sleeve 53 defines a shaft sleeve hole 531 extending though a centre of the shaft sleeve 53, a pair of sliding through slots 532 extending laterally, and a pair of positioning flanges 533. The shaft sleeve hole 531 is configured to be extended by the screw cutter 60. The pair of sliding through slots 532 are configured to be extended by the pair of sliding half threaded sheaths 54. An end of the shaft sleeve 53 extends inside the undertaking groove 523 of the movable bracket 52. The pair of positioning flanges 533 are positioned on opposite edges of each sliding through slot 532, i.e. each positioning flanges 533 is positioned between the pair of sliding through slot 532.

Figure 12:
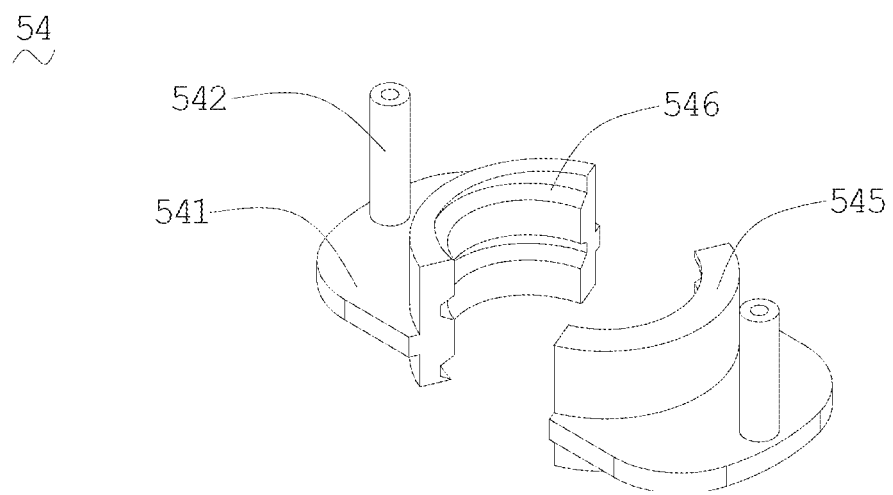
FIG. 12 is a perspective view of a sliding half threaded sheath.
Figure 13:
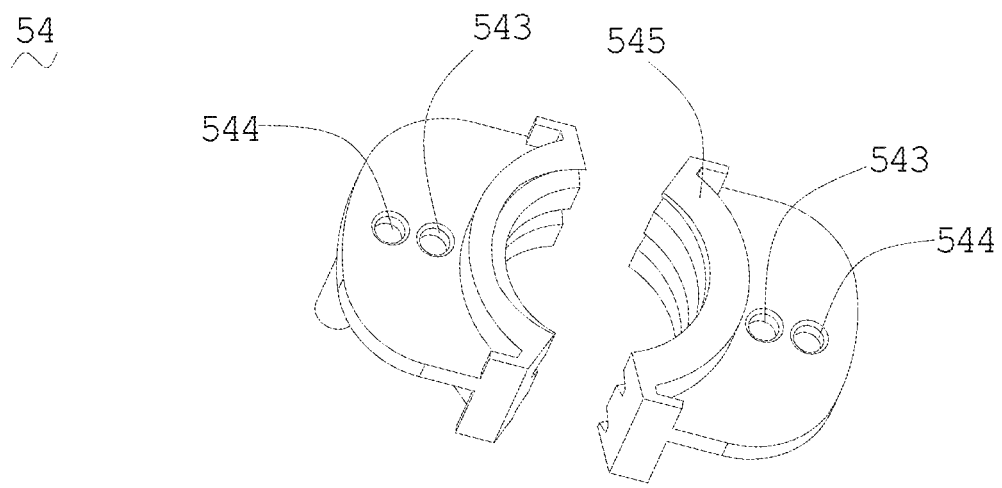
FIG. 13 is similar to FIG. 12, but viewed from another aspect.

Referring to FIG. 12 and FIG. 13, each sliding half threaded sheath 54 includes a substrate 541, a guiding post 542 positioned on an outer side of a top surface of the substrate 541 and extending upwardly, a first positioning hole 543 and a second positioning hole 544 which are positioned on a bottom of the substrate 541, an arc-shaped stand 545 extending from an inner side of the substrate 541. The first positioning hole 543 is positioned adjacent to the arc-shaped stand 545 than the second positioning hole 544. An inner side surface of the arc-shaped stand 545 is provided with a threaded groove 546 engaging a thread of the screw cutter 60. The sliding half threaded sheath 54 guides and fixes the screw cutter 60 via the threaded groove 546, and enables the screw cutter 60 to perform an accurate cutting motion downwardly. When the rotating cover 55 rotates, it drives the sliding half threaded sheath 54 to slide along a radial direction of the shaft sleeve 53. The positioning post 522 is switchably latched between the first positioning hole 543 and the second positioning hole 544 and latches into and positioned in one of the two holes.

Figure 14:
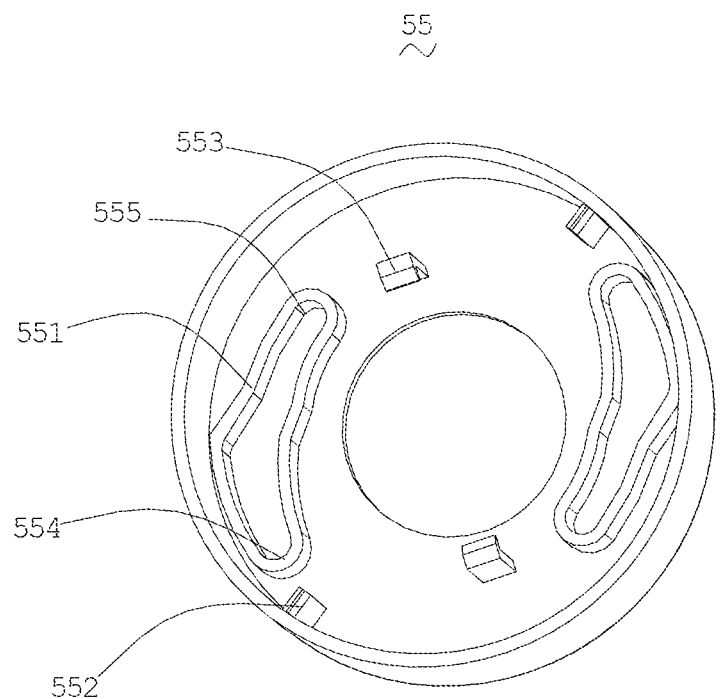
FIG. 14 is a perspective view of a rotating cover.

Referring to FIG. 14, the rotating cover 55 defines a central hole at a middle portion, the rotating cover 55 defines a pair of elongated guiding grooves 551 on opposite edges of a bottom surface of the rotating cover 55. The guiding groove 551 is configured to receive a top of corresponding guiding post 542. The rotating cover 55 includes a pair of symmetrical pushing blocks 552 and a pair of symmetrical positioning buckles 553, which extend from the bottom surface of the rotating cover 55. The guiding groove 551 receives and engages the guiding post 542 of the sliding half threaded sheath 54. The pushing block 552 abuts a top of the guiding sheet 521 of the movable bracket 52. The positioning buckle 553 engages the positioning flange 533 of the shaft sleeve 53, and provides a fixation function for the rotating cover 55. The guiding groove 551 includes a first guiding portion 554 and a second guiding portion 555. A distance between the first guiding portion 554 and a center of the rotating cover 55 is greater than a distance between the second guiding portion 555 and the center of the rotating cover 55, such that the sliding half threaded sheath 54 is driven by the guiding post 542 to move away from or toward a center position of shaft sleeve 53 via driving the guiding post 542 by the guiding groove 551 of the rotating cover 55.

Figure 15:
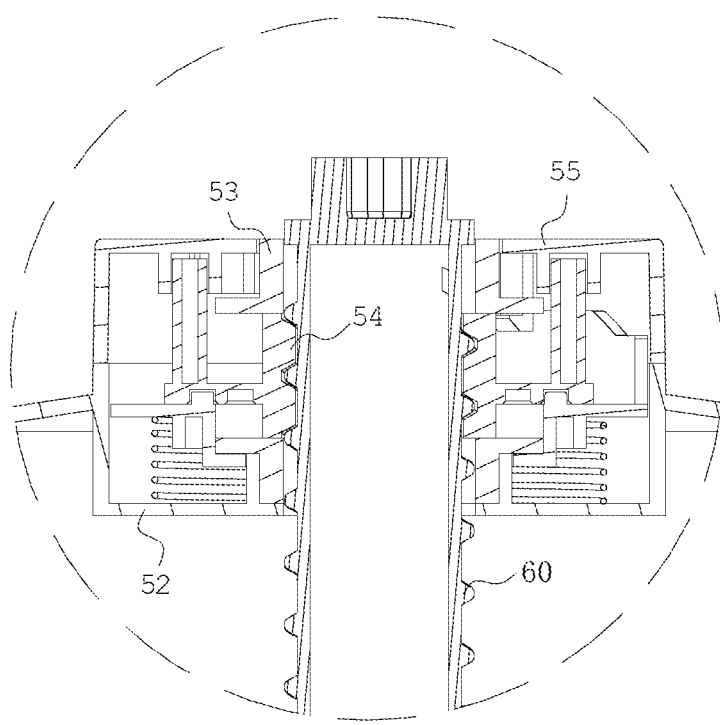
FIG. 15 is an enlarged view of circled portion A in FIG. 3.
Figure 16:
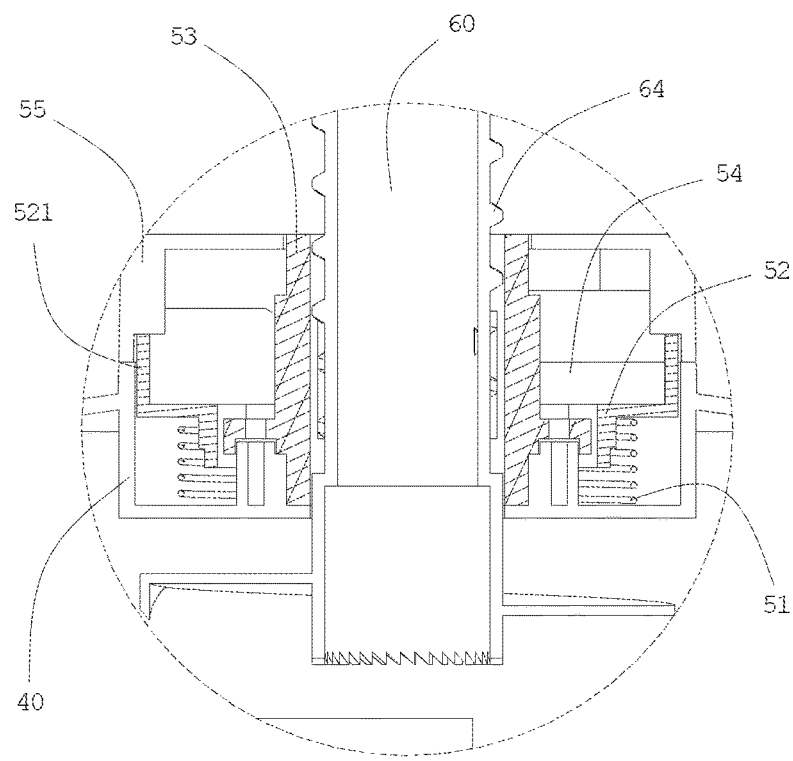
FIG. 16 is an enlarged view of circled portion B in FIG. 4.
Figure 17:
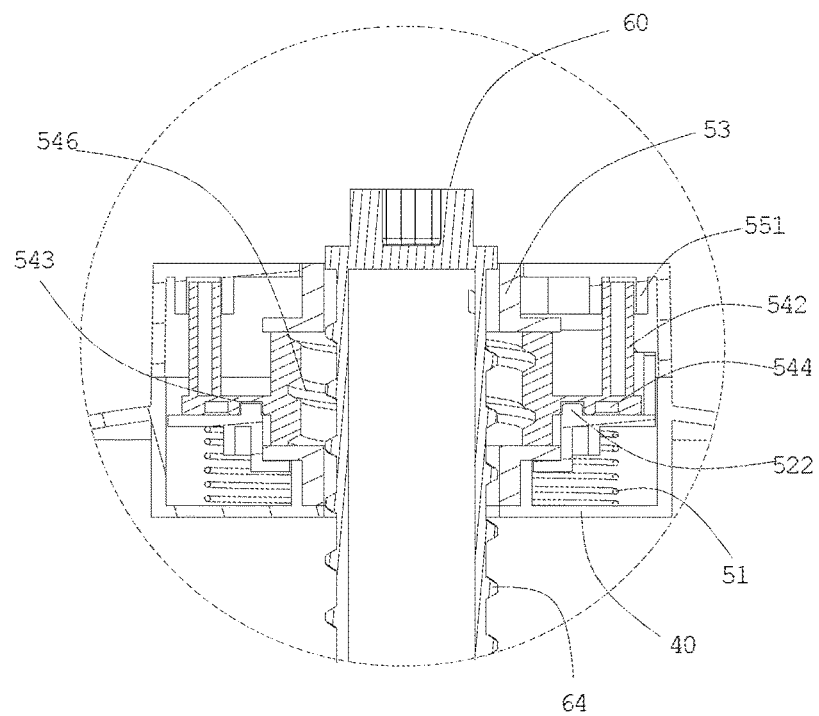
FIG. 17 is an enlarged view of circled portion C in FIG. 5.

Referring to FIG. 15 through FIG. 17, when assemble, the fixing base 30 is assembled to the vessel cup 20, the resilient member 51 is positioned in the containing groove 42 of the supporting body 40, the movable bracket 52 is assembled above the resilient member 51. And then the shaft sleeve 53 is assembled to the undertaking groove 523 of the movable bracket 52, and an end of the shaft sleeve 53 is connected the bottom surface of the containing groove 42. The sliding half threaded sheaths 54 are assembled to the sliding through slots 532 on opposite sides of the shaft sleeve 53. The rotating cover 55 is then assembled to the supporting body 40. The screw cutter 60 extends through the sliding half threaded sheaths 54 upwardly. The rotating cover 55 drives the sliding half threaded sheaths 54 to move toward a centre, thereby securing the screw cutter 60. The supporting body 40 extends into the vessel cup 20. At last, the handheld host 70 is connected to screw cutter 60. When in use, the handheld host 70 is initiated to drive the screw cutter 60 to rotate and move downwardly, thereby cutting the food positioned on the fixing base 30.

In above food cutter 70, a high-speed cutting can be achieved via driving the screw cutter 60 by the handheld host 70, it is time saving and labor saving, and a cutting quality can be secured simultaneously. The rotating cover 55 of the locking mechanism 50 rotates anticlockwise (or clockwise). The pushing block 552 moves along the first end surface 524, the second end surface 525, the third end surface 526, the fourth end surface 527, and the fifth end surface 528 of the guiding sheet 521 of the movable bracket 52, thereby moving the movable bracket 52 downwardly or moving the movable bracket 52 upwardly by the resilient member 54. When the movable bracket 52 moves upwardly, the guiding grooves 551 drive the pair of sliding half threaded sheaths 54 to move away from each other via driving the guiding posts 542, thereby enabling the positioning post 522 to move from the second positioning hole 544 to the first positioning hole 543. When the movable bracket 52 moves downwardly, the positioning post 522 reaches and engages into the first positioning hole 543, thereby the screw cutter 60 is released. When the screw cutter 60 is required to engage the pair of sliding half threaded sheaths 54, the rotating cover 55 is rotated to drive the pair of sliding half threaded sheaths 54 to move toward each other via driving the guiding posts 542 by the guiding grooves 551, at the same time, the movable bracket 52 is be moved upwardly by the resilient member 51, and the positioning post 522 is capable of moving from the first positioning hole 542 to the second positioning hole 544, when the positioning post 522 engages into the second positioning hole 544, the rotating cover 55 abuts the third end surface 526 of the movable bracket 52, therefore, the movable bracket 52 abuts the resilient member 51. The screw cutter 60 engages the pair of sliding half threaded sheaths 54.

The position post 522 is switched between the first positioning hole 543 and the second positioning hole 544, thereby realizing a fixation of the screw cutter 60 (as shown in FIG. 16) quickly, or realizing a release of the screw cutter 60 (as shown in FIG. 17) quickly, therefore, the screw cutter 60 can be dismantled and washed timely, and is prepared for the next cut, and a work efficiency is thereby enhanced.

Although the invention is illustrated and described herein with reference to specific embodiments, the invention is not intended to be limited to the details shown. Rather, various modifications may be made in the details within the scope and range of equivalents of the claims and without departing from the invention. The scope of the invention is set forth in the following claims along with their full scope of equivalents.

What is claimed is:

1. A food cutter, comprising:
   a vessel cup;
   a fixing base assembled in the vessel cup;
   a supporting body assembled to the vessel cup;
   a locking mechanism assembled in the supporting body;
   a screw cutter extending through the supporting body and the locking mechanism; and
   a handheld host connected to the screw cutter;
   wherein the locking mechanism comprises a resilient member, a movable bracket, a shaft sleeve, two sliding half threaded sheaths, and a rotating cover, an end of the resilient member abuts the supporting body, the other end of the resilient member abuts the movable bracket, the sliding half threaded sheaths are connected to the movable bracket and are slidable relative to the shaft sleeve, the rotating cover abuts the movable bracket, wherein the rotating cover rotates to drive the sliding half threaded sheaths to slide and contact the shaft sleeve and engage the screw cutter, or drive the sliding half threaded sheaths to slide out from the shaft sleeve and disengage from the screw cutter.

2. The food cutter according to claim 1, wherein the rotating cover defines two guiding grooves at a bottom portion thereof opposite to each other, each guiding groove comprises a first guiding portion and a second guiding portion, a distance between the first guiding portion and a center of the rotating cover is greater than a distance between the second guiding portion and the center of the rotating cover, each sliding half threaded sheath comprises a guiding post, a top of the guiding post latches into the corresponding guiding groove of the rotating cover.

3. The food cutter according to claim 2, wherein each sliding half threaded sheath further comprises a substrate and an arc-shaped stand, the guiding post is positioned on a top surface of the substrate and extends upwardly, the arc-shaped stand is provided with a threaded groove engaging a thread of the screw cutter.

4. The food cutter according to claim 3, wherein the substrate of each sliding half threaded sheath is provided with a first positioning hole and a second positioning hole on a bottom, the movable bracket is provided with a positioning post, when the rotating cover rotates to drive the sliding half threaded sheath to slide along a radial direction of the shaft sleeve, the positioning post is switchably latched between the first positioning hole and the second positioning hole.

5. The food cutter according to claim 3, wherein the movable bracket further comprises two guiding sheets and an undertaking groove, the two guiding sheets are symmetrically positioned on the movable bracket and extends upwardly, the shaft sleeve extends inside the undertaking groove.

6. The food cutter according to claim 5, wherein the rotating cover comprises two pushing blocks, each pushing block abuts a top surface of the guiding sheet, a middle portion of each guiding sheet is higher than both ends of the guiding sheet.

7. The food cutter according to claim 6, wherein a top surface of the guiding sheet comprises a first end surface, a second end surface, a third end surface, a fourth end surface and a fifth end surface connected in a sequence, the third end surface which is positioned in the middle portion is higher than the other end surfaces, the first end surface and the fifth end surface which are positioned in opposite ends of the guiding sheet are lower than the other end surfaces, the second end surface and the fourth end surface extend obliquely.

8. The food cutter according to claim 2, wherein the rotating cover is provided with two positioning buckles on the bottom, the two positioning buckles are connected to the shaft sleeve.

9. The food cutter according to claim 1, wherein the shaft sleeve defines a shaft sleeve hole extending though a center thereof and two sliding through slots extending laterally, the two sliding through slots are opposite to each other, the screw cutter extends through the shaft sleeve hole, the two sliding half threaded sheaths are slidably received in the two sliding through slots, the screw cutter comprises a connecting portion, a threaded pipe, and a disc cutter arranged in a sequence downwardly, the connecting portion and the disc cutter are connected to opposite ends of the threaded pipe, respectively, the connecting portion is connected to the handheld host.

10. The food cutter according to claim 1, wherein the fixing base comprises a fixing base body and a plurality of positioning lugs, the fixing base body defines a plurality of latching cutouts and is provided with a limiting ring, the positioning lug extends from an end of the limiting ring which is adjacent to the vessel cup to an opposite end, the vessel cup is provided with a plurality of erected protrusion ribs and a plurality of latching strips, the protrusion ribs engage the latching cutouts, the supporting body defines a plurality of latching grooves, the plurality of latching strips engage the plurality of latching grooves.

11. A food cutter, comprising:
a vessel cup;
a supporting body assembled to the vessel cup;
a locking mechanism assembled in the supporting body;
a screw cutter extending through the supporting body and the locking mechanism; and
a handheld host connected to the screw cutter;
wherein the locking mechanism comprises a resilient member, a movable bracket, a shaft sleeve, two sliding half threaded sheaths, and a rotating cover, the resilient member is positioned between the supporting body and the movable bracket, the shaft sleeve defines a shaft sleeve hole extending though a center thereof and two sliding through slots extending laterally, the screw cutter extends through the shaft sleeve hole, the two sliding half threaded sheaths are received in the two sliding through slots and engage the movable bracket, the two sliding half threaded sheaths are slidable relative to the shaft sleeve, the rotating cover abuts the movable bracket, wherein the rotating cover rotates to drive the two sliding half threaded sheaths to slide toward each other to engage the screw cutter, or drive the two sliding half threaded sheaths to slide away from each other to disengage from the screw cutter.

12. The food cutter according to claim 11, wherein the rotating cover defines two guiding grooves at a bottom portion thereof opposite to each other, each guiding groove comprises a first guiding portion and a second guiding portion, a distance between the first guiding portion and a center of the rotating cover is greater than a distance between the second guiding portion and the center of the rotating cover, each sliding half threaded sheath comprises a guiding post, a top of the guiding post latches into the corresponding guiding groove of the rotating cover.

13. The food cutter according to claim 12, wherein the sliding half threaded sheath comprises a substrate and an arc-shaped stand, the guiding post is positioned on a top surface of the substrate and extends upwardly, the arc-shaped stand is provided with a threaded groove engaging a thread of the screw cutter.

14. The food cutter according to claim 13, wherein the substrate of the sliding half threaded sheath is provided with a first positioning hole and a second positioning hole on a bottom, the movable bracket is provided with a positioning post, when the rotating cover rotates to drive the sliding half threaded sheath to slide along a radial direction of the shaft sleeve, the positioning post is switchably latched between the first positioning hole and the second positioning hole.

15. The food cutter according to claim 13, wherein the movable bracket further comprises two guiding sheets and an undertaking groove, the two guiding sheets are symmetrically positioned on the movable bracket and extend upwardly, the shaft sleeve extends inside the undertaking groove.

16. The food cutter according to claim 15, wherein the rotating cover comprises two pushing blocks, each pushing block abuts a top surface of the guiding sheet, a middle portion of each guiding sheet is higher than both ends of the guiding sheet.

17. The food cutter according to claim 16, wherein a top surface of the guiding sheet comprises a first end surface, a second end surface, a third end surface, a fourth end surface and a fifth end surface connected in a sequence, the third end surface which is positioned in the middle portion is higher than the other end surfaces, the first end surface and the fifth end surface which are positioned in opposite ends of the guiding sheet are lower than the other end surfaces, the second end surface and the fourth end surface extend obliquely.

18. The food cutter according to claim 12, wherein the rotating cover is provided with the two positioning buckles on the bottom, the two positioning buckles are connected to the shaft sleeve.

19. The food cutter according to claim 11, wherein the two sliding through slots are opposite to each other, the screw cutter extends through the shaft sleeve hole, the two sliding half threaded sheaths are slidably received in the two sliding through slots, the screw cutter comprises a connecting portion, a threaded pipe, and a disc cutter arranged in a sequence downwardly, the connecting portion and the disc cutter are connected to opposite ends of the threaded pipe, respectively, the connecting portion is connected to the handheld host.

20. The food cutter according to claim 11, further comprising a fixing base received in the vessel cup, the fixing base comprises a fixing base body and a plurality of positioning lugs, the fixing base body defines a plurality of latching cutouts and is provided with a limiting ring, the positioning lug extends from an end of the limiting ring which is adjacent to the vessel cup to an opposite end, the vessel cup is provided with a plurality of erected protrusion ribs and a plurality of latching strips, the protrusion ribs engage the latching cutouts, the supporting body defines a plurality of latching grooves, the plurality of latching strips engage the plurality of latching grooves.

* * * * *